US008417019B2

United States Patent
Wang

(10) Patent No.: US 8,417,019 B2
(45) Date of Patent: Apr. 9, 2013

(54) IMAGE CORRECTION SYSTEM AND METHOD

(75) Inventor: Guang-Jian Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 56 days.

(21) Appl. No.: 13/192,482

(22) Filed: Jul. 28, 2011

(65) Prior Publication Data

US 2012/0155760 A1 Jun. 21, 2012

(30) Foreign Application Priority Data

Dec. 21, 2010 (CN) .......................... 2010 1 0598922

(51) Int. Cl.
G06K 9/00 (2006.01)
H04N 5/253 (2006.01)

(52) U.S. Cl.
USPC .............................. 382/145; 382/167; 348/87

(58) Field of Classification Search .................. 382/161, 382/209, 219, 217, 218, 143, 144–145, 148–149, 382/199, 288; 356/237.1; 348/9, 87
See application file for complete search history.

(56) References Cited

U.S. PATENT DOCUMENTS

| 6,320,977 | B1 * | 11/2001 | Tokura | 382/151 |
| 6,571,196 | B2 * | 5/2003 | Kosuge | 702/167 |
| 6,640,002 | B1 * | 10/2003 | Kawada | 382/141 |
| 7,181,059 | B2 * | 2/2007 | Duvdevani et al. | 382/149 |
| 7,206,443 | B1 * | 4/2007 | Duvdevani et al. | 382/149 |
| 7,388,978 | B2 * | 6/2008 | Duvdevani et al. | 382/145 |
| 2004/0120571 | A1 * | 6/2004 | Duvdevani et al. | 382/149 |
| 2004/0126005 | A1 * | 7/2004 | Duvdevani et al. | 382/149 |
| 2009/0046922 | A1 * | 2/2009 | Yoshikawa | 382/149 |

OTHER PUBLICATIONS

Choi et al, Real-Time Inspection System for Printed Circuit Boards, DAGM 2003, LNCS 2781, pp. 458-465, 2003.*

* cited by examiner

*Primary Examiner* — Andrae S Allison
(74) *Attorney, Agent, or Firm* — Altis Law Group, Inc.

(57) ABSTRACT

In an image correction method, an image of an object is captured, and a standard image of the object is obtain from a storage system of a computing device. A target area contains most image characteristics of the object is determined from the standard image of the object, and a standard pixel block having N×N pixels is extracted from the target area. The captured image is divided into M pixel blocks having N×N pixels. Each of the pixel blocks of the captured image are analyzed with the standard pixel block. A pixel value of each pixel of the captured image is corrected according the analysis, and the corrected image is output to a display device of a computing device for display.

18 Claims, 3 Drawing Sheets

IMAGE CORRECTION SYSTEM AND METHOD

BACKGROUND

1. Technical Field

Embodiments of the present disclosure relate to image processing technologies, and particularly to an image correction system and method for correcting an image captured from an object.

2. Description of Related Art

Automatic optical inspection (AOI) devices are widely used to automatically inspect a captured image of an object which is being tested, such as a motherboard or a printed circuit board (PCB). During the testing process of the object, a plurality of image of the object may be captured on a fixed platform. Since the captured image may suffer from many factors, such as platform shock or lens shake of the AOI device, it is important to correct the suffered images to improve the image quality of the captured images of the object.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
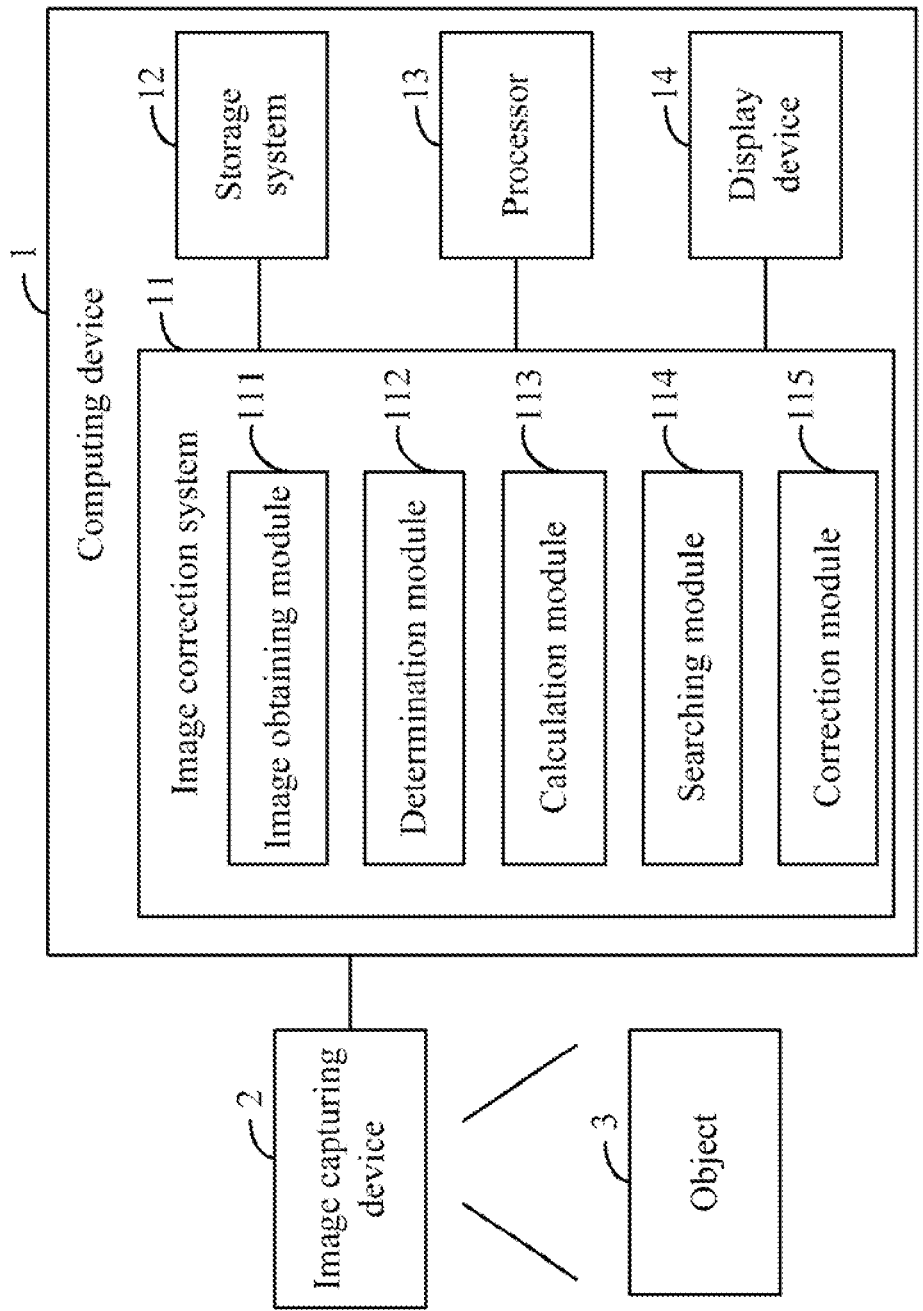
FIG. 1 is a block diagram of one embodiment of a computing device including an image correction system.
Figure 2:
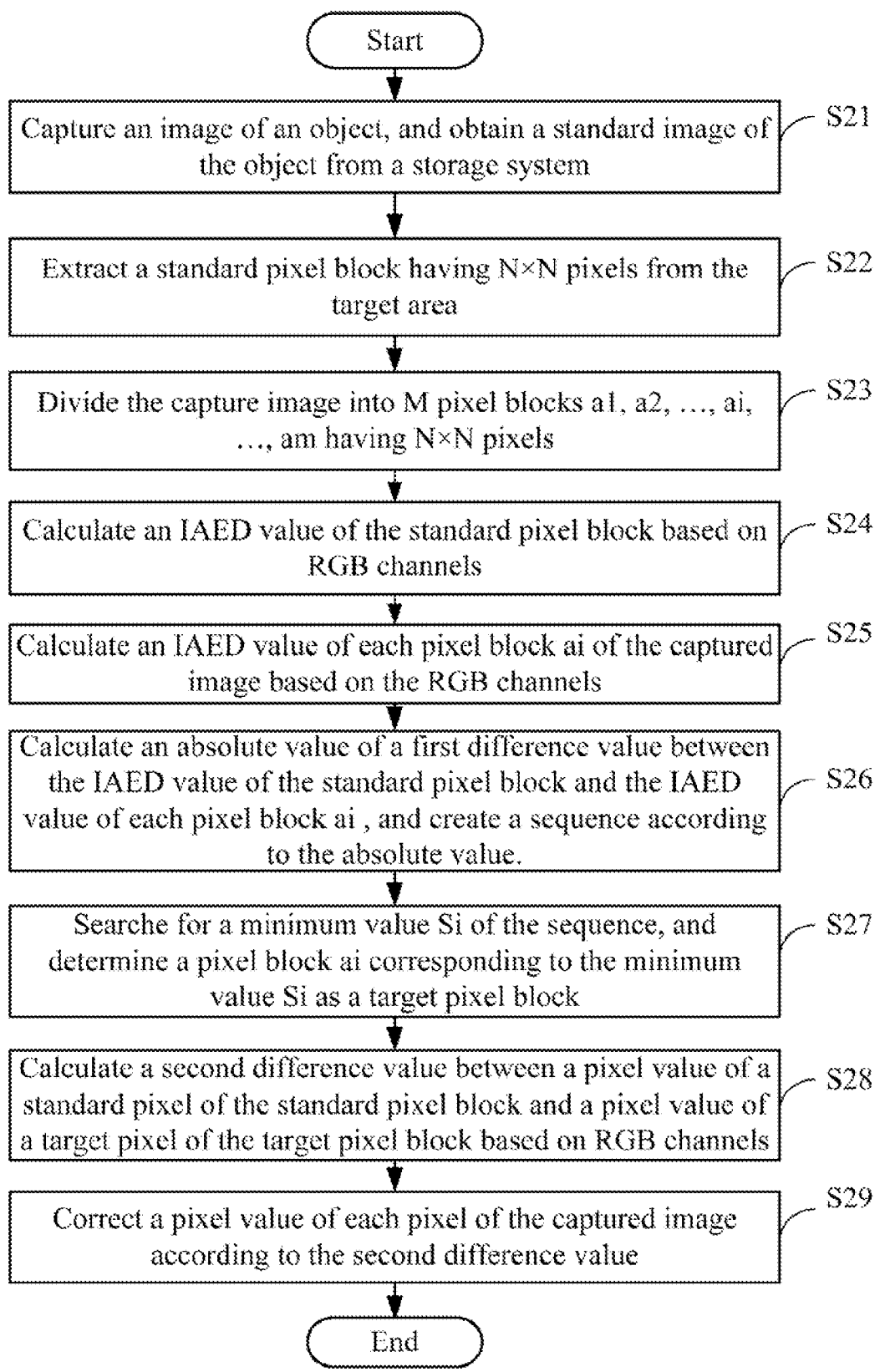
FIG. 2 is a flowchart of one embodiment of an image correction method for correcting a captured image of an object using the system of FIG. 1.
Figure 3:
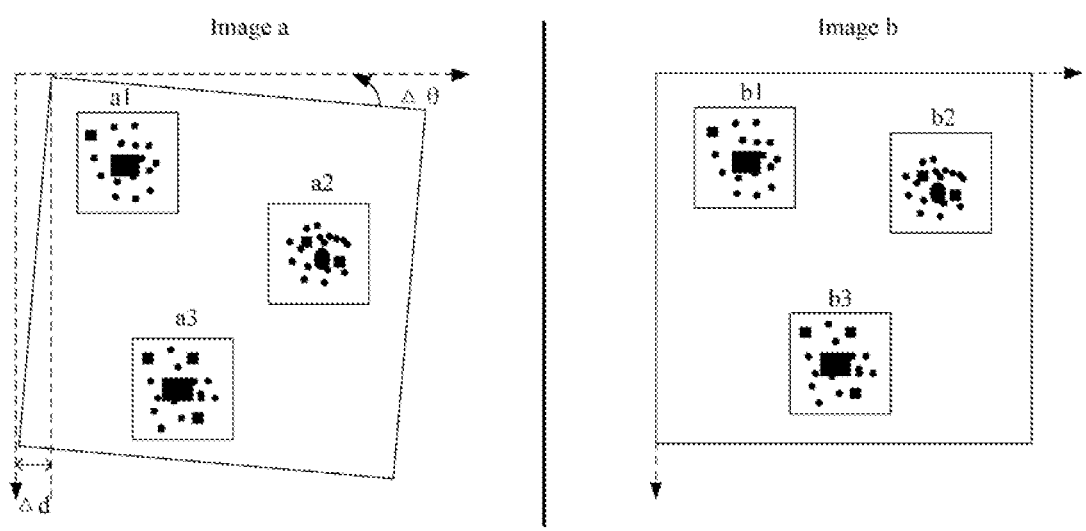
FIG. 3 is a schematic diagram illustrating one example of a captured image and a standard image of the object.

FIG. 1 is a block diagram of one embodiment of a computing device 1 including an image correction system 11. In the embodiment, the computing device 1 connects to an image capturing device 2 such as a digital camera. The image capturing device 2 captures images (as shown in FIG. 3) of an object 3, such as a motherboard of a computer, which is being tested. The computing device 1 may further include a storage system 12, at least one processor 13, and a display device 14.

The storage system 12 stores a prototypical image or a standard image (herein after referred as to "standard image") of the object 3, such as the image b as shown in FIG. 3, and one or more programs of the image correction system 11. In one embodiment, the storage system 12 may be an internal storage system, such as a random access memory (RAM) for temporary storage of information, and/or a read only memory (ROM) for the permanent storage of information. In some embodiments, the storage system 12 may also be an external storage system, such as an external hard disk, a storage card, or a data storage medium.

When a captured image of the object 3 suffers from external factors, such as lens shake of the image capturing device 2, the image correction system 11 can analyze the captured image by comparing the captured image with the standard image of the object 3 to correct the captured image according to the standard image. In one example, assuming that the object 3 is fixed on a platform has a X axis and a Y axis, the captured images of the object 3 may suffer deviations of the image capturing device 2, such as those mentioned above. As shown in FIG. 3, a deflective image of the object 3 is captured, and can be corrected by the image correction system 11 according to the standard image (e.g., image b of FIG. 3). Details are described below.

In one embodiment, the image correction system 11 includes an image obtaining module 111, a determination module 112, a calculation module 113, a searching module 114, and a correction module 115. The modules 111-115 may comprise computerized instructions in the form of one or more programs that are stored in the storage system 12, and executed by the at least one processor 13 to provide functions of the image correction system 11. In general, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

The image obtaining module 111 is operable to capture an image of the object 3 using the image capturing device 2, and to obtain the standard image of the object 3 from the storage system 12. As shown in FIG. 3, the captured image may be different from the standard image, since the captured image may have been influenced by external factors, such as the platform shock or lens shake of the image capturing device 2.

The determination module 112 is operable to determine a target area from the standard image that contains most image characteristics of the object 3, and extract a standard pixel block having N×N pixels (e.g., 32×32) from the target area. In the embodiment, the central pixel of the standard pixel block is defined as a standard pixel. As shown in FIG. 3, the pixel block b1, b2, or b3 may be extracted as the standard pixel block from the target area.

The determination module 112 is further operable to divide the captured image into M pixel blocks having N×N pixels. In one example, the determination module 112 may divide the captured image into pixel blocks a1, a2, ... ai, ..., am. Each of the pixel block am has N×N pixels of the captured image.

The calculation module 113 is operable to calculate an image average energy density (IAED) value of the standard pixel block based on red, green, and blue (RGB) channels, and an IAED value of each pixel block of the captured image based on the RGB channels. In one embodiment, the RGB channels includes a R channel, a G channel, and a B channel. The IAED value of the standard pixel block includes an IAED value IAED_b_R of the R channel of the standard pixel block, an IAED value IAED_b_G of the G channel of the standard pixel block, and an IAED value IAED_b_B of the B channel of the standard pixel block. The IAED value of each pixel block of the captured image includes an IAED value IAED_ai_R of the R channel of each pixel block ai, an IAED value IAED_ai_G of the G channel of the pixel block ai, and an IAED value IAED_ai_B of the B channel of the pixel block ai, where $1 \leq i \leq M$. The IAED is defined as an image energy density of each pixel of the image having N*N pixels, and is calculated according to a calculation equation IAED=(R+G+B)/N/N, where R represents a pixel value of the R channel, G represents a pixel value of the G channel, and B represents a pixel value of the B channel. The pixel value of the R channel, G channel, or B channel may be an integer in the range 0 to 255.

The calculation module 113 is further operable to calculate an absolute value of a first difference value between the IAED value of the standard pixel block and the IAED value of each pixel block of the captured image, and create a sequence {S1, S2, ..., Si, ..., Sm} according to the calculated absolute value. The first difference value includes a difference value D_Ri between the IAED value of the R channel of the standard pixel block and the IAED value of the R channel of each pixel block ai of the captured image, a difference value D_Gi between the IAED value of the G channel of the standard pixel block and the IAED value of the G channel of the pixel block ai, and a difference value D_Bi between the IAED value of the B channel of the standard pixel block and the IAED value of the B channel of the pixel block ai. That is, the absolute value includes a absolute value |D_Ri| of D_Ri, an absolute value |D_Gi| of D_Gi, and an absolute value |D_Bi| of D_Bi. In the embodiment, the difference value D_Ri=IAED_b_R−IAED_ai_R, the difference value D_Gi=IAED_b_G−IAED_ai_G, the difference D_Bi=IAED_b_B−IAED_ai_B, and Si=|D_Ri|+|D_Gi|+|D_Bi|.

The searching module 114 is operable to search for a minimum value Si of the sequence {S1, S2, ..., Si, ..., Sm}, and determine a corresponding pixel block ai of the captured image as a target pixel block, in which a central pixel of the target pixel block is defined as a target pixel.

The correction module 115 is operable to calculate a second difference value between a pixel value of the standard pixel and a pixel value of the target pixel based on RGB channels, and correct a pixel value of each pixel of the captured image according to the second difference value. The second difference value includes a difference value D_R between a pixel value of the R channel of the standard pixel and a pixel value of the R channel of the target pixel, a difference value D_G between a pixel value of the G channel of the standard pixel and a pixel value of the G channel of the target pixel, and a difference value D_B between a pixel value of the B channel of the standard pixel and a pixel value of the B channel of the target pixel. In one example, if the pixel value of the standard pixel based on the RGB channels is (85, 221, 255), and the pixel value of the target pixel based on the RGB channels is (80, 205, 230), the difference value D_R is calculated as 85−80=5, the difference value D_G is calculated as 221−205=16, the difference value D_B is calculated as 255−230=25, and the second difference value is (5, 16, 25). The correction module 115 may correct each pixel of the captured image according to the second difference value (5, 16, 25). In addition, the correction module 115 further outputs the corrected image to the display device 14 for display, and store the corrected image in the storage system 12.

FIG. 3 is a one embodiment of an image correction method for correcting a captured image of an object 3 using the image correction system 11 of FIG. 1. In the embodiment, the method can correct the captured image according to a standard image of the object 3 stored in the storage system 12. Depending on the embodiment, additional blocks may be added, others removed, and the ordering of the blocks may be changed.

In block S21, the image obtaining module 111 captures an image of the object 3 using the image capturing device 2, and obtains the standard image of the object 3 from the storage system 12.

In block S22, the determination module 112 determines a target area that contains most image characteristics of the object 3 from the standard image, and extracts a standard pixel block having N×N pixels (e.g., 32×32) from the target area, in which a central pixel of the standard pixel block is defined as a standard pixel.

In block S23, the determination module 112 divides the captured image into M pixel blocks having N×N pixels. In one example, the determination module 112 may divide the captured image into pixel blocks a1, a2, ... ai, ..., am. Each of the pixel block am has N×N pixels of the captured image.

In block S24, the calculation module 113 calculates an image average energy density (IAED) value of the standard pixel block based on the RGB channels. The IAED value of the standard pixel block includes an IAED value IAED_b_R of the R channel of the standard pixel block, an IAED value IAED_b_G of the G channel of the standard pixel block, and an IAED value IAED_b_B of the B channel of the standard pixel block.

In block S25, the calculation module 113 calculates an IAED value of each pixel block ai of the captured image based on the RGB channels. The IAED value of each pixel block ai of the captured image includes an IAED value IAED_ai_R of the R channel of each pixel block ai, an IAED value IAED_ai_G of the G channel of the pixel block ai, and an IAED value IAED_ai_B of the B channel of the pixel block ai, where $1 \leq i \leq M$.

In block S26, the calculation module 113 calculates an absolute value of a first difference value between the IAED value of the standard pixel block and the IAED value of each pixel block of the captured image, and creates a sequence {S1, S2, ..., Si, ..., Sm} according to the calculated absolute value. The first difference value includes a difference value D_Ri between the IAED value of the R channel of the standard pixel block and the IAED value of the R channel of each pixel block ai of the captured image, a difference value D_Gi between the IAED value of the G channel of the standard pixel block and the IAED value of the G channel of the pixel block ai, and a difference value D_Bi between the IAED value of the B channel of the standard pixel block and the IAED value of the B channel of the pixel block ai. That is, the absolute value includes a absolute value |D_Ri| of D_Ri, an absolute value |D_Gi| of D_Gi, and an absolute value |D_Bi| of D_Bi. In the embodiment, the difference value D_Ri=IAED_b_R−IAED_ai_R, the difference value D_Gi=IAED_b_G−IAED_ai_G, the difference D_Bi=IAED_b_B−IAED_ai_B, and Si=|D_Ri|+|D_Gi|+|D_Bi|.

In block S27, the searching module 114 searches for a minimum value Si of the sequence {S1, S2, ..., Si, ..., Sm}, and determine a pixel block ai corresponding to the minimum value Si of the captured image as a target pixel block, in which a central pixel of the target pixel block is defined as a target pixel.

In block S28, the correction module 115 calculates a second difference value between a pixel value of the standard pixel and a pixel value of the target pixel based on RGB channels. The second difference value includes a difference value D_R between a pixel value of the R channel of the standard pixel and a pixel value of the R channel of the target pixel, a difference value D_G between a pixel value of the G channel of the standard pixel and a pixel value of the G channel of the target pixel, and a difference value D_B between a pixel value of the B channel of the standard pixel and a pixel value of the B channel of the target pixel.

In block S29, the correction module 115 corrects a pixel value of each pixel of the captured image according to the second difference value. In one example, if the pixel value of the standard pixel based on the RGB channels is (85, 221, 255), and the pixel value of the target pixel based on the RGB channels is (80, 205, 230), the difference value D_R is calculated as 85−80=5, the difference value D_G is calculated as 221−205=16, the difference value D_B is calculated as 255−230=25, and the second difference value is (5, 16, 25). The correction module 115 may correct each pixel of the captured image according to the second difference value (5, 16, 25). In addition, the correction module 115 further outputs the corrected image to the display device 14 for display, and store the corrected image in the storage system 12.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, the computing device being connected to an image capturing device, the computing device consisting of:
    a storage system;
    at least one processor; and
    one or more programs stored in the storage system and executable by the at least one processor, the one or more programs comprising:
    an image obtaining module operable to capture an image of the object using the image capturing device, and obtain a standard image of the object from the storage system;
    a determination module operable to determine a target area that contains most image characteristics of the object from the standard image, extract a standard pixel block having N×N pixels from the target area, divide the captured image into M pixel blocks a1, a2, . . . ai, . . . , am, in which a central pixel of the standard pixel block is defined as a standard pixel, and each pixel block ai has N×N pixels;
    a calculation module operable to calculate an image average energy density (IAED) value of the standard pixel block based on red, green, and blue (RGB) channels and an IAED value of each pixel block ai of the captured image based on the RGB channels, calculate an absolute value of a first difference value between the IAED value of the standard pixel block and the IAED value of each pixel block of the captured image, and create a sequence S1, S2, . . . , Si, . . . , Sm according to the absolute value;
    a searching module operable to search for a minimum value Si of the sequence S1, S2, . . . , Si, . . . , Sm, and determine a pixel block ai corresponding to the minimum value Si as a target pixel block, in which a central pixel of the target pixel block is defined as a target pixel; and
    a correction module operable to calculate a second difference value between a pixel value of the standard pixel and a pixel value of the target pixel based on the RGB channels, correct a pixel value of each pixel of the captured image according to the second difference value, and output the corrected image to a display device of the computing device for display.

2. The computing device according to claim 1, wherein the IAED value is defined as an image energy density of each pixel of an image having N×N pixels, and is calculated according to a calculation equation IAED=(R+G+B)/N/N, wherein R represents a pixel value of an R channel, G represents a pixel value of a G channel, and B represents a pixel value of a B channel.

3. The computing device according to claim 1, wherein the IAED value of the standard pixel block includes an IAED value of the R channel of the standard pixel block, an IAED value of the G channel of the standard pixel block, and an IAED value of the B channel of the standard pixel block.

4. The computing device according to claim 3, wherein the IAED value of each pixel block ai of the captured image includes an IAED value of the R channel of each pixel block ai, an IAED value of the G channel of the pixel block ai, and an IAED value of the B channel of the pixel block ai, where $1 \leq i \leq M$.

5. The computing device according to claim 4, wherein the first difference value includes a difference value between the IAED value of the R channel of the standard pixel block and the IAED value of the R channel of each pixel block ai of the captured image, a difference value between the IAED value of the G channel of the standard pixel block and the IAED value of the G channel of the pixel block ai, and a difference value between the IAED value of the B channel of the standard pixel block and the IAED value of the B channel of the pixel block ai.

6. The computing device according to claim 1, wherein the second difference value includes a difference value between a pixel value of the R channel of the standard pixel and a pixel value of the R channel of the target pixel, a difference value between a pixel value of the G channel of the standard pixel and a pixel value of the G channel of the target pixel, and a difference value between a pixel value of the B channel of the standard pixel and a pixel value of the B channel of the target pixel.

7. A method for correcting a captured image of an object using a computing device, the method consisting of:
    capturing an image of the object using an image capturing device, and obtaining a standard image of the object from a storage system of the computing device;
    determining a target area that contains most image characteristics of the object from the standard image, and extracting a standard pixel block having N×N pixels from the target area, in which a central pixel of the standard pixel block is defined as a standard pixel;
    dividing the captured image into M pixel blocks a1, a2, . . . ai, . . . , am, each pixel block ai having N×N pixels;
    calculating an image average energy density (IAED) value of the standard pixel block based on red, green, and blue (RGB) channels, and an IAED value of each pixel block ai of the captured image based on the RGB channels;
    calculating an absolute value of a first difference value between the IAED value of the standard pixel block and the IAED value of each pixel block of the captured image, and creating a sequence S1, S2, . . . , Si, . . . , Sm according to the absolute value;
    searching for a minimum value S1 of the sequence S1, S2, . . . , Si, . . . , Sm, and determining a pixel block ai corresponding to the minimum value Si as a target pixel block, in which a central pixel of the target pixel block is defined as a target pixel;
    calculating a second difference value between a pixel value of the standard pixel and a pixel value of the target pixel based on RGB channels; and
    correcting pixel value of each pixel of the captured image according to the second difference value, and outputting the corrected image on a display device of the computing device for display.

8. The method according to claim 7, wherein the IAED value is defined as an image energy density of each pixel of an image having N×N pixels, and is calculated according to a calculation equation IAED=(R+G+B)/N/N, wherein R represents a pixel value of an R channel, G represents a pixel value of a G channel, and B represents a pixel value of a B channel.

9. The method according to claim 7, wherein the IAED value of the standard pixel block includes an IAED value of the R channel of the standard pixel block, an IAED value of the G channel of the standard pixel block, and an IAED value of the B channel of the standard pixel block.

10. The method according to claim 9, wherein the IAED value of each pixel block ai of the captured image includes an IAED value of the R channel of each pixel block ai, an IAED value of the G channel of the pixel block ai, and an IAED value of the B channel of the pixel block ai, where $1 \leq i \leq M$.

11. The method according to claim 10, wherein the first difference value includes a difference value between the IAED value of the R channel of the standard pixel block and the IAED value of the R channel of each pixel block ai of the captured image, a difference value between the IAED value of the G channel of the standard pixel block and the IAED value of the G channel of the pixel block ai, and a difference value between the IAED value of the B channel of the standard pixel block and the IAED value of the B channel of the pixel block ai.

12. The method according to claim 7, wherein the second difference value includes a difference value between a pixel value of the R channel of the standard pixel and a pixel value of the R channel of the target pixel, a difference value between a pixel value of the G channel of the standard pixel and a pixel value of the G channel of the target pixel, and a difference value between a pixel value of the B channel of the standard pixel and a pixel value of the B channel of the target pixel.

13. A non-transitory computer-readable medium having stored thereon instructions that, when executed by at least one processor of a computing device, causes the computing device to perform an method for correcting a captured image of an object, the method consisting of:

capturing an image of the object using an image capturing device, and obtaining a standard image of the object from a storage system of the computing device;

determining a target area that contains most image characteristics of the object from the standard image, and extracting a standard pixel block having N×N pixels from the target area, in which a central pixel of the standard pixel block is defined as a standard pixel;

dividing the captured image into M pixel blocks a1, a2, ... ai, ..., am, each pixel block ai having N×N pixels;

calculating an image average energy density (IAED) value of the standard pixel block based on red, green, and blue (RGB) channels, and an IAED value of each pixel block ai of the captured image based on the RGB channels;

calculating an absolute value of a first difference value between the IAED value of the standard pixel block and the IAED value of each pixel block of the captured image, and creating a sequence S1, S2, ..., Si, ..., Sm according to the absolute value;

searching for a minimum value Si of the sequence S1, S2, ..., Si, ..., Sm, and determining a pixel block ai corresponding to the minimum value Si as a target pixel block, in which a central pixel of the target pixel block is defined as a target pixel;

calculating a second difference value between a pixel value of the standard pixel and a pixel value of the target pixel based on RGB channels; and correcting pixel value of each pixel of the captured image according to the second difference value, and outputting the corrected image on a display device of the computing device for display.

14. The non-transitory computer-readable medium according to claim 13, wherein the IAED value is defined as an image energy density of each pixel of an image having N×N pixels, and is calculated according to a calculation equation IAED=(R+G+B)/N/N, wherein R represents a pixel value of an R channel, G represents a pixel value of a G channel, and B represents a pixel value of a B channel.

15. The non-transitory computer-readable medium according to claim 13, wherein the IAED value of the standard pixel block includes an IAED value of the R channel of the standard pixel block, an IAED value of the G channel of the standard pixel block, and an IAED value of the B channel of the standard pixel block.

16. The non-transitory computer-readable medium according to claim 15, wherein the IAED value of each pixel block ai of the captured image includes an IAED value of the R channel of each pixel block ai, an IAED value of the G channel of the pixel block ai, and an IAED value of the B channel of the pixel block ai, where $1 \leq i \leq M$.

17. The non-transitory computer-readable medium according to claim 16, wherein the first difference value includes a difference value between the IAED value of the R channel of the standard pixel block and the IAED value of the R channel of each pixel block ai of the captured image, a difference value between the IAED value of the G channel of the standard pixel block and the IAED value of the G channel of the pixel block ai, and a difference value between the IAED value of the B channel of the standard pixel block and the IAED value of the B channel of the pixel block ai.

18. The non-transitory computer-readable medium according to claim 13, wherein the second difference value includes a difference value between a pixel value of the R channel of the standard pixel and a pixel value of the R channel of the target pixel, a difference value between a pixel value of the G channel of the standard pixel and a pixel value of the G channel of the target pixel, and a difference value between a pixel value of the B channel of the standard pixel and a pixel value of the B channel of the target pixel.

* * * * *